(12) United States Patent
Kim

(10) Patent No.: US 11,238,677 B2
(45) Date of Patent: Feb. 1, 2022

(54) APPARATUS AND METHOD FOR ANALYZING DRIVING DATA, AND VEHICLE SYSTEM

(71) Applicants: Hyundai Motor Company, Seoul (KR); Kia Motors Corporation, Seoul (KR)

(72) Inventor: Jung Wan Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 353 days.

(21) Appl. No.: 16/429,613

(22) Filed: Jun. 3, 2019

(65) Prior Publication Data

US 2020/0134941 A1 Apr. 30, 2020

(30) Foreign Application Priority Data

Oct. 30, 2018 (KR) .................. 10-2018-0130923

(51) Int. Cl.
| | |
|---|---|
| *G07C 5/08* | (2006.01) |
| *G06F 16/22* | (2019.01) |
| *G06F 16/28* | (2019.01) |
| *B60W 50/14* | (2020.01) |
| *G06F 16/29* | (2019.01) |
| *G07C 5/00* | (2006.01) |

(52) U.S. Cl.
CPC .............. *G07C 5/085* (2013.01); *B60W 50/14* (2013.01); *G06F 16/22* (2019.01); *G06F 16/285* (2019.01); *G06F 16/29* (2019.01); *G07C 5/008* (2013.01); *B60W 2050/146* (2013.01)

(58) Field of Classification Search
CPC ...... G07C 5/085; G07C 5/008; G07C 5/0816; G06F 16/22; G06F 16/285; G06F 16/29; B60W 50/14; B60W 2050/146; G08G 1/0112
USPC ........................................................ 701/119
See application file for complete search history.

(56) References Cited

U.S. PATENT DOCUMENTS 7,840,339 B2 * 11/2010 Kim ..................... G08G 1/0962
                                                       701/119
8,989,914 B1 * 3/2015 Nemat-Nasser ... G06K 9/00335
                                                          701/1

(Continued)

FOREIGN PATENT DOCUMENTS

CN         202013661 U    * 10/2011
CN         201510572479   * 11/2015

(Continued)

*Primary Examiner* — Muhammad Shafi
(74) *Attorney, Agent, or Firm* — Morgan, Lewis & Bockius LLP

(57) ABSTRACT

The present disclosure relates to a driving data analyzing apparatus and method, and a vehicle system. The driving data analyzing apparatus according to an exemplary embodiment of the present disclosure includes a database (DB) storing a data matrix for each of a plurality of sections predetermined on a road of a map, a controller storing driving data received from vehicles passing through each of the plurality of sections in a data matrix of a corresponding section. The controller is configured to analyze a driving abnormality state of a vehicle passing through the corresponding section based on a mean value of the driving data stored in the data matrix of the corresponding section.

22 Claims, 13 Drawing Sheets

(56) References Cited

U.S. PATENT DOCUMENTS

| | | | |
|---|---|---|---|
| 10,431,078 B2* | 10/2019 | Van Laethem | G01C 21/32 |
| 2002/0059017 A1* | 5/2002 | Yamane | G08G 1/08 |
| | | | 701/1 |
| 2007/0157120 A1* | 7/2007 | Kim | G08G 1/0962 |
| | | | 715/810 |
| 2013/0135092 A1 | 5/2013 | Wu et al. | |
| 2017/0003668 A1* | 1/2017 | Burt | G05B 19/042 |
| 2018/0119801 A1* | 5/2018 | Frait | B60W 10/113 |
| 2019/0120158 A1* | 4/2019 | Komeno | F02M 26/48 |

FOREIGN PATENT DOCUMENTS

| | | | | |
|---|---|---|---|---|
| CN | 106448159 A | * | 2/2017 | |
| CN | 106530704 A | * | 3/2017 | |
| DE | 102019114595 A1 | * | 2/2020 | ......... B60W 30/143 |
| JP | 2013033324 A | | 2/2013 | |
| JP | 2013-114668 A | | 6/2013 | |
| KR | 10-2012-0007232 A | | 1/2012 | |
| KR | 20170002040 | * | 1/2017 | |
| KR | 10-1763915 B | | 8/2017 | |

\* cited by examiner

| Matrix (Z Case) | GPS MAP Points (N Case) | VEHICLE TYPE (K Case) | ACCELERATION/ DECELERATION (2 Case) |
|---|---|---|---|
| Matrix 1 | Range 1 | Type 1 | ACCELERATION |
| Matrix 2 | Range 1 | Type 1 | DECELERATION |
| ⋮ | ⋮ | ⋮ | ⋮ |
| Matrix 2K-1 | Range 1 | Type K | ACCELERATION |
| Matrix 2K | Range 1 | Type K | DECELERATION |
| ⋮ | ⋮ | ⋮ | ⋮ |
| Matrix Z-1 | Range N | Type K | ACCELERATION |
| Matrix Z | Range N | Type K | DECELERATION |

FIG. 4A

APPARATUS AND METHOD FOR ANALYZING DRIVING DATA, AND VEHICLE SYSTEM

CROSS-REFERENCE TO RELATED APPLICATION

This application claims the benefit of priority to Korean Patent Application No. 10-2018-0130923, filed on Oct. 30, 2018 with the Korean Intellectual Property Office, the entire contents of which are incorporated herein by reference.

TECHNICAL FIELD

The present disclosure relates to a driving data analyzing apparatus and method, and a vehicle system.

BACKGROUND

While providing map information, a navigation system provides information such as construction information, fog, fallout range, sudden deceleration, and/or traffic flow at the same time.

A vehicle terminal may receive information necessary for safe driving from the navigation system to guide a driver. However, it is not easy to receive information about the road, on which a vehicle is driving, in real time, and it is difficult to apply the information about the road in real time because it is difficult to identify the detailed information.

Moreover, the vehicle terminal may identify the state of the vehicle; and the vehicle terminal may guide the driver through the warning light of the vehicle when something goes wrong. However, the vehicle terminal may not alert the driver when there is no warning means other than the warning lamp of the vehicle and the abnormal state occurs without providing the warning light.

Accordingly, the driver needs to be aware of the vehicle's abnormal state and needs to get vehicle maintenance. In this case, when the driver does not recognize the vehicle's abnormal state, there is a risk of an accident.

SUMMARY

The present disclosure has been made to solve the above-mentioned problems occurring in the prior art while advantages achieved by the prior art are maintained intact.

An aspect of the present disclosure provides a driving data analyzing apparatus and method that classify and store driving data for each section of road, for each vehicle type, for each acceleration type or deceleration type, and easily detect the abnormal driving state of the vehicle or the abnormal state of the road through the classified driving data, and a vehicle system The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a driving data analyzing apparatus includes a database (DB) storing a data matrix for each of a plurality of sections predetermined on a road of a map, a controller storing driving data received from vehicles passing through each of the plurality of sections in a data matrix of a corresponding section. The controller is configured to analyze a driving abnormality state of a vehicle passing through the corresponding section based on a mean value of the driving data stored in the data matrix of the corresponding section.

According to an aspect of the present disclosure, the data matrix is classified into a plurality of data matrices for each of the sections depending on a vehicle type and an acceleration or deceleration type of the driving data.

According to an aspect of the present disclosure, the controller the controller is configured to classify a type of each driving data, using the driving data and vehicle information received from each of the vehicles and to determine a data matrix corresponding to the classified type of each driving data to store the driving data in the corresponding data matrix.

According to an aspect of the present disclosure, the driving data the driving data includes speed, acceleration, steering angle, GPS information, and pressurization information of an accelerator and brake pedals of the vehicle.

According to an aspect of the present disclosure, the controller is configured to classify the driving data as an acceleration type when the speed of the vehicle is determined to be increasing and the accelerator pedal is determined to be in a pressurized state, and to classify the driving data as an deceleration type when the speed of the vehicle is determined to be decreasing and the brake pedal is determined to be in a pressurized state.

According to an aspect of the present disclosure, the controller is configured to calculate a mean value of each of speed, acceleration, and steering angle from the driving data stored in each data matrix during a specific time.

According to an aspect of the present disclosure, the controller is configured to calculate a vector distance between the mean values of each of the speed, the acceleration, and the steering angle stored in each data matrix during the specific time and the speed, the acceleration, and the steering angle of the vehicle entering the corresponding section and to calculate a deviation percentage for the calculated vector distance.

According to an aspect of the present disclosure, the controller is configured to collect failure rate information about a driving or braking function for each vehicle type to compare the failure rate information with the calculated deviation percentage and to determine the driving abnormality state of the vehicle passing through the corresponding section depending on the comparison result.

According to an aspect of the present disclosure, the controller is configured to detect the driving abnormality state of the vehicle at a predetermined time unit from a first time point when the vehicle enters the corresponding section to a second time point when the vehicle leaves the corresponding section.

According to an aspect of the present disclosure, the controller is configured to store driving abnormality information of the vehicle in a corresponding data matrix, when the driving abnormality state of a specific rate or more is continuously detected for the vehicle from the first time point when the vehicle enters the corresponding section to the second time point when the vehicle leaves the corresponding section.

According to an aspect of the present disclosure, the controller is configured to determine the driving abnormality state of the vehicle, when the data matrix, which stores the driving abnormality information of the vehicle, from among data matrices corresponding to each section on a driving route of the vehicle is continuously detected more than a specific rate when driving of the vehicle is terminated.

According to an aspect of the present disclosure, the controller is configured to transmit a driving abnormality notification signal to at least one of the vehicle and a terminal registered in advance, when the driving abnormality state of the vehicle is determined.

According to an aspect of the present disclosure, a driving data analyzing apparatus includes a DB storing a data matrix for each of a plurality of sections predetermined on a road of a map, a controller storing driving data received from vehicles passing through each of the plurality of sections in a data matrix of a corresponding section. The controller is configured to analyze a road abnormality state of the corresponding section based on a mean value of the driving data stored in the data matrix of the corresponding section.

According to an aspect of the present disclosure, the data matrix is classified into a plurality of data matrices for each of the sections depending on a vehicle type and an acceleration or deceleration type of the driving data.

According to an aspect of the present disclosure, the controller is configured to calculate a mean value and a standard deviation of each of speed, acceleration, and steering angle for each of the plurality of sections from the driving data stored in each data matrix during a predetermined time.

According to an aspect of the present disclosure, the controller is configured to compare speed, acceleration, and steering angle of each of the vehicles passing through each of the plurality of sections with mean values of speed, acceleration, and steering angle for each of the sections to determine the road abnormality state of the corresponding section depending on the comparison result.

According to an aspect of the present disclosure, the controller is configured to detect the road abnormality state of the corresponding section, when a rate of vehicles that are out of a range of a standard deviation from the mean value of each of speed, acceleration, and steering angle for the corresponding section among speeds, accelerations, and steering angles of each of the vehicles passing through the plurality of sections is not less than a specific rate.

According to an aspect of the present disclosure, the controller is configured to determine the road abnormality state of a corresponding road section, when the road abnormality state is detected in continuous sections, the number of which is not less than a specific number.

According to an aspect of the present disclosure, the controller is configured to transmit the road abnormality notification signal to the vehicles that are driving on the corresponding road section or on a road adjacent to the corresponding road section, when the road abnormality state of one road section is determined.

According to an aspect of the present disclosure, a method of analyzing driving data includes storing a data matrix for each of a plurality of sections predetermined on a road of a map, in a DB, storing driving data received from vehicles passing through each of the plurality of sections in a data matrix of a corresponding section, and analyzing a driving abnormality state of a vehicle passing through the corresponding section or a road abnormality state of the corresponding section based on a mean value of the driving data stored in the corresponding section.

According to an aspect of the present disclosure, a vehicle system includes a plurality of vehicle terminals configured to collect driving data from a plurality of sensors when driving in a section predetermined on a road and a driving data analyzing apparatus. The driving data analyzing apparatus is configured to store the driving data received from the plurality of vehicle terminals in a data matrix of the corresponding section and to analyze a driving abnormality state of a vehicle passing through the corresponding section or a road abnormality state of the corresponding section based on a mean value of the driving data stored in a data matrix of the corresponding section.

According to an aspect of the present disclosure, the vehicle terminal is configured to turn on a warning light, when a driving abnormality notification signal of the vehicle is received from the driving data analyzing apparatus.

According to an aspect of the present disclosure, the vehicle terminal is configured to guide a road abnormality section through navigation, when a road abnormality notification signal for one section is received from the driving data analyzing apparatus.

BRIEF DESCRIPTION OF THE DRAWINGS

The above and other objects, features and advantages of the present disclosure will be more apparent from the following detailed description taken in conjunction with the accompanying drawings:

FIGS. 4A, 4B, and 5 are views illustrating an exemplary embodiment used to describe a data matrix generating operation of a driving data analyzing apparatus, according to an exemplary embodiment of the present disclosure;

DETAILED DESCRIPTION

Figure 1:
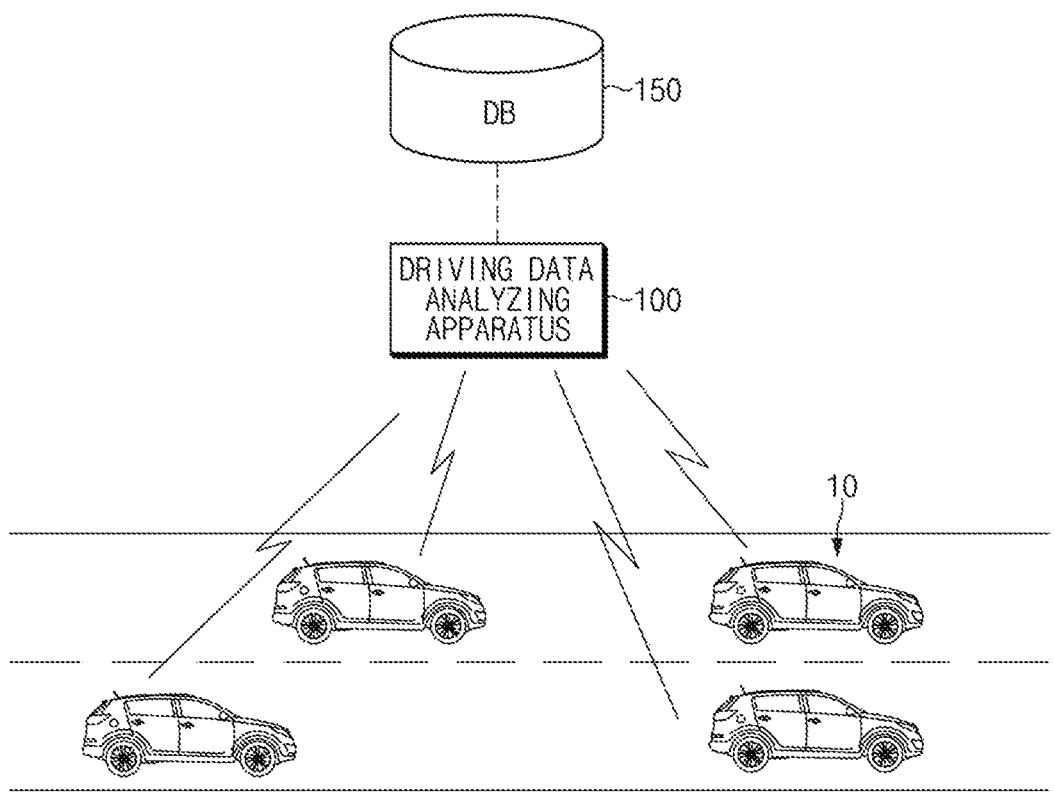
FIG. 1 is a view illustrating a vehicle system to which a driving data analyzing apparatus is applied, according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a view illustrating a vehicle system to which a driving data analyzing apparatus is applied, according to an exemplary embodiment of the present disclosure.

Referring to FIG. 1, a vehicle system according to an exemplary embodiment of the present disclosure includes a plurality of vehicle terminals 10 and a driving data analyzing apparatus 100.

Each of the vehicle terminals 10 is installed in each vehicle to collect driving data of a vehicle and transmits the collected driving data and vehicle information to the driving data analyzing apparatus 100. The detailed configuration of the vehicle terminal 10 is described with reference to FIG. 2.

Figure 2:
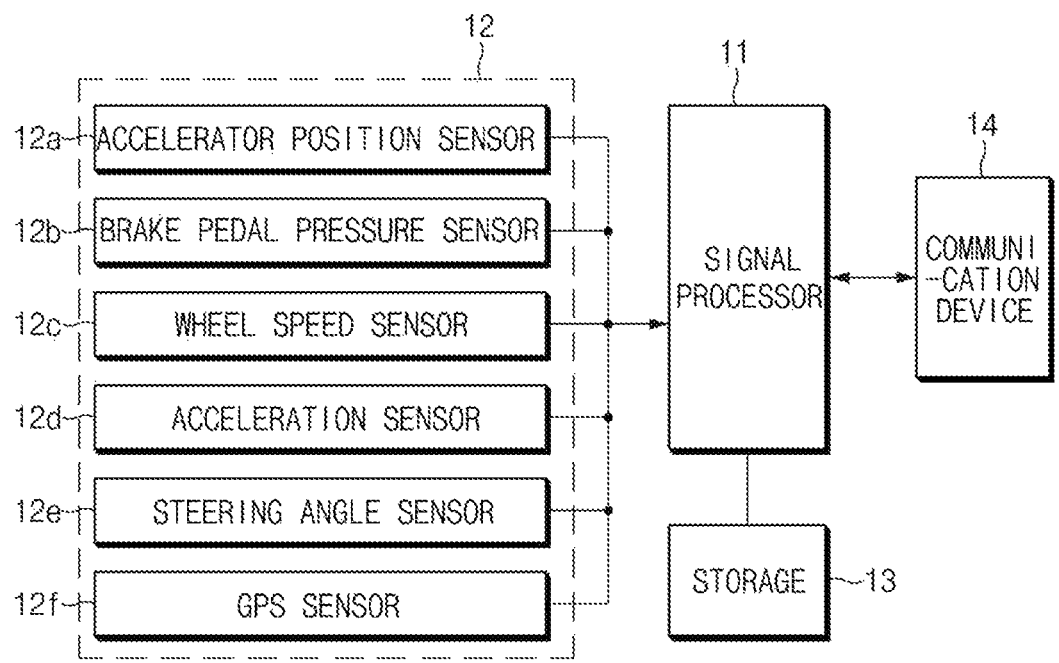
FIG. 2 is a block diagram illustrating a configuration of a vehicle terminal, according to an exemplary embodiment of the present disclosure.

FIG. 2 is a block diagram illustrating a configuration of a vehicle terminal, according to an exemplary embodiment of the present disclosure. Referring to FIG. 2, the vehicle terminal 10 may include a signal processor 11, a sensor device 12, storage 13, and a communication device 14.

The sensor device 12 of the vehicle terminal 10 may include a plurality of sensors for collecting driving data while the vehicle is driving. For example, the plurality of sensors may include an accelerator position sensor 12a, a brake pedal pressure sensor 12b, a wheel speed sensor 12c, an acceleration sensor 12d, a steering angle sensor 12e, a GPS sensor 12f, and the like. The signal processor 11 may be an electric circuitry that executes instructions of software which thereby performs various functions described hereinafter.

The signal processor 11 of the vehicle terminal 10 transmits driving data collected by the plurality of sensors, to the driving data analyzing apparatus 100 through the communication device 14 when the vehicle enters a predetermined section. At this time, the signal processor 11 extracts the vehicle information stored in advance in the storage 13 and includes the extracted vehicle information in the driving data to transmit the driving data to the driving data analyzing apparatus 100. Here, the vehicle information may be vehicle type information and/or identification information capable of identifying a vehicle.

The signal processor 11 may transmit driving data and vehicle information to the driving data analyzing apparatus 100 until the vehicle exits the predetermined section. At this time, the signal processor 11 may periodically transmit driving data and vehicle information, which are collected while the vehicle is in a predetermined section, to the driving data analyzing apparatus 100.

The predetermined section may be a section in which a corresponding road includes a specific size or width. There may be a plurality of predetermined sections, and the plurality of sections may be continuously arranged along a road.

The storage 13 of the vehicle terminal 10 may store data and/or an algorithm required to operate the vehicle terminal 10. Also, the storage 13 may store driving data collected by the sensor device 12.

Herein, the storage 13 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The communication device 14 of the vehicle terminal 10 may include a communication module that supports a communication interface with the driving data analyzing apparatus 100. For example, the communication module may include a module for wireless Internet access or a module for short range communication. Herein, the wireless Internet technology may include a wireless LAN (WLAN), a Wireless Broadband (Wibro), a Wi-Fi, a World Interoperability for Microwave Access (Wimax), and the like; the short range communication technology may include Bluetooth, ZigBee, Ultra Wideband (UWB), Radio Frequency Identification (RFID), Infrared Communication (Infrared Data Association (IrDA)), and the like.

In the meantime, the driving data analyzing apparatus 100 may generate a data matrix categorized for each of a plurality of sections predetermined on the road of a map and may store the driving data, which is collected from the vehicle terminal 10 entering each section of the plurality of predetermined sections, in a data matrix of the corresponding section. At this time, the driving data analyzing apparatus 100 may analyze the driving data stored in the data matrix for each section and may determine an abnormal state of the vehicle and/or road based on the analysis result. The driving data analyzing apparatus 100 may provide the abnormal state of the vehicle and/or road to the vehicle terminal 10 of the corresponding vehicle and/or surrounding vehicle. Here, the driving data analyzing apparatus 100 may be implemented in the form of a server. The detailed configuration of the driving data analyzing apparatus 100 is described with reference to FIG. 3.

Figure 3:
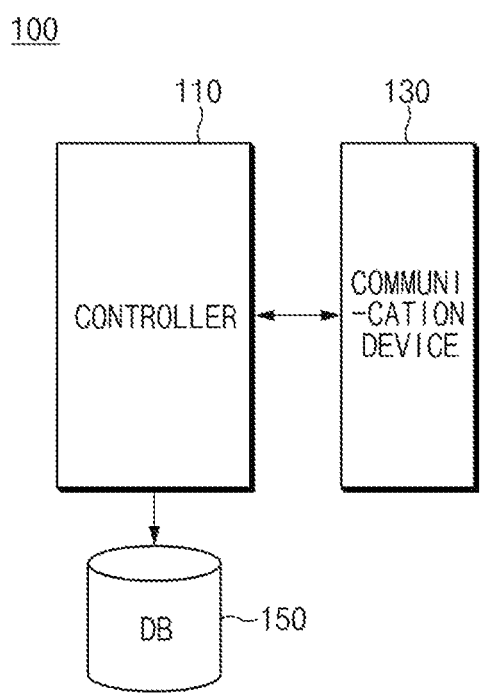
FIG. 3 is a diagram illustrating a configuration of a driving data analyzing apparatus, according to an exemplary embodiment of the present disclosure.

FIG. 3 is a diagram illustrating a configuration of a driving data analyzing apparatus 100, according to an exemplary embodiment of the present disclosure. Referring to FIG. 3, the driving data analyzing apparatus 100 may include a controller 110, a communication device 130, and a DB 150.

The controller 110 of the driving data analyzing apparatus 100 according to an exemplary embodiment of the present disclosure may be implemented through a non-transitory memory (not shown) configured to store data with respect to algorithms configured to control operations of various components in the vehicle or software instructions reproducing the algorithms, and a processor (not shown) configured to perform the operations described hereinafter by using the data stored in the memory. Herein, the memory and the processor may be implemented as separate semiconductor circuits. Alternatively, the memory and the processor may be implemented as a single semiconductor circuit integrated with each other. The processor may take the form of one or more processor(s).

The communication device 130 of the driving data analyzing apparatus 100 may include a communication module that supports a communication interface with the vehicle terminal 10. For example, the communication module may include a module for wireless Internet access or a module for short range communication. Herein, the wireless Internet technology may include a wireless LAN (WLAN), a Wireless Broadband (Wibro), a Wi-Fi, a World Interoperability for Microwave Access (Wimax), and the like; the short range communication technology may include Bluetooth, ZigBee, Ultra Wideband (UWB), Radio Frequency Identification (RFID), Infrared Communication (Infrared Data Association (IrDA)), and the like.

The DB 150 of the driving data analyzing apparatus 100 may store a data matrix for each of a plurality of sections predetermined on the road of the map.

Moreover, the DB 150 may store the command and/or algorithm for analyzing the driving data and determining the abnormal state of the vehicle and/or road.

Herein, the DB 150 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The controller 110 generates a data matrix of each section based on driving data collected from each of the vehicle terminals 10 entering a predetermined section and vehicle information. Here, the data matrix may be generated for each section, vehicle type, and acceleration or deceleration type.

The data matrix may be classified into a plurality of data matrices depending on the vehicle type for each section and the acceleration/deceleration type of driving data.

Figure 4B:
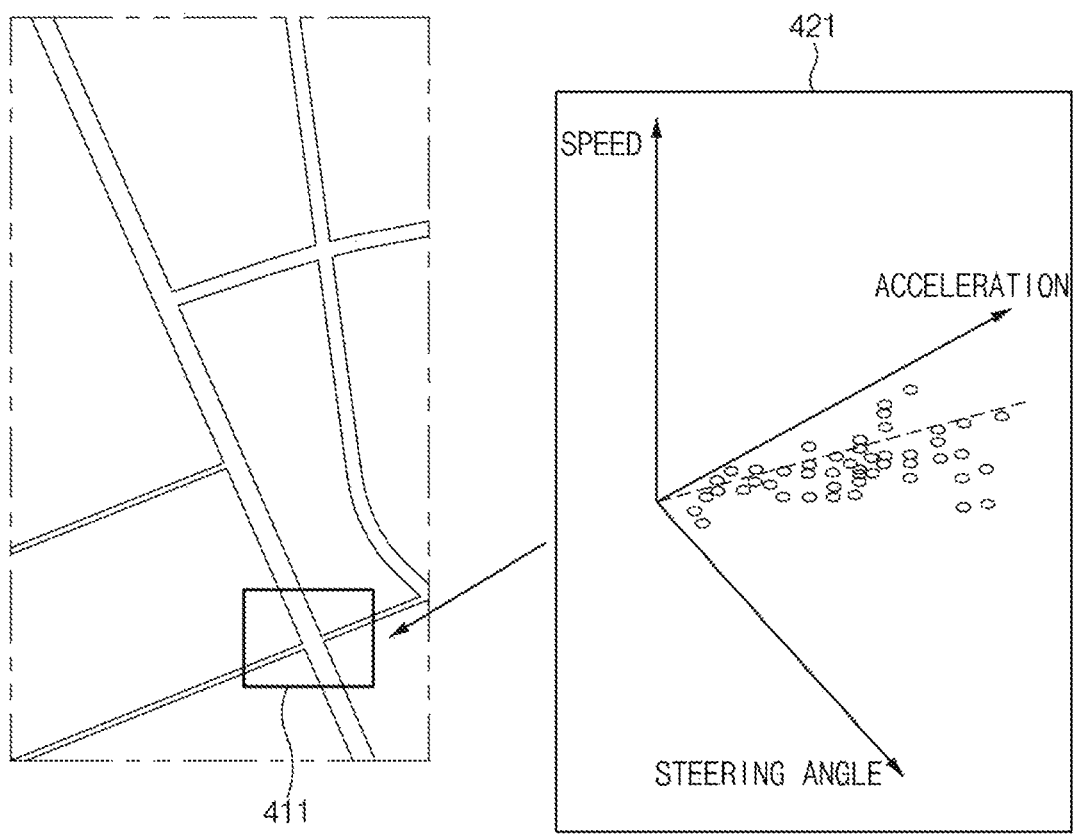
Figure 5:
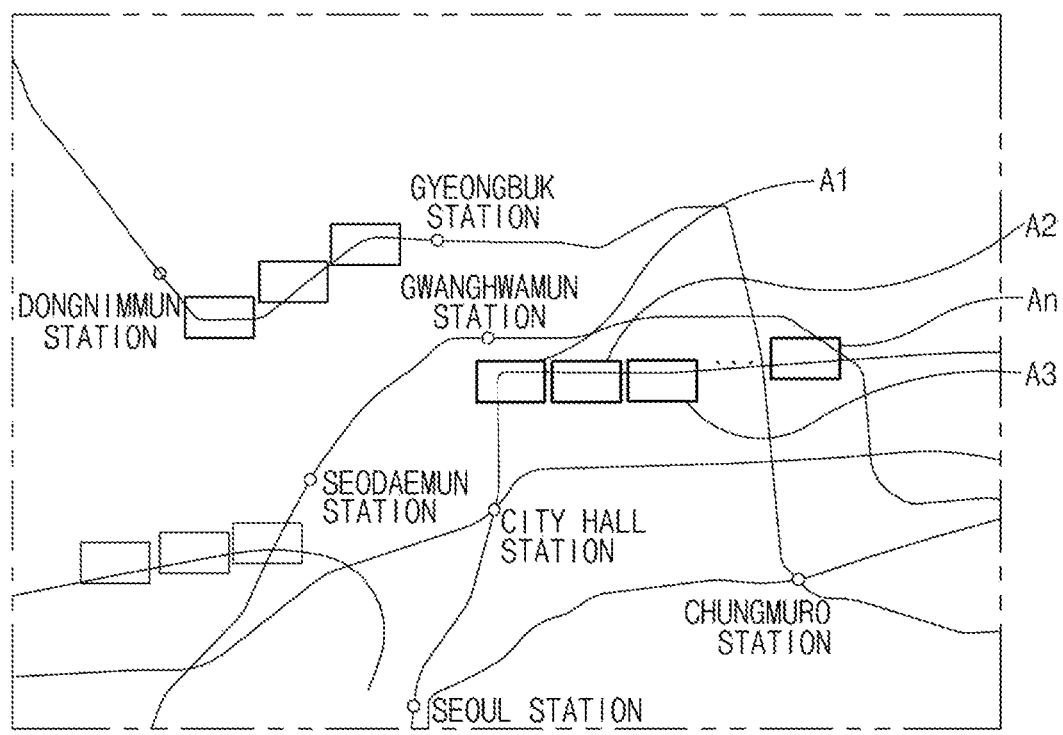

An exemplary embodiment to generate a data matrix refers to the embodiments of FIGS. 4A, 4B, and 5.

FIG. 4A is a diagram illustrating a data matrix generation condition. FIG. 4B is a diagram illustrating a data matrix generated in response to a region on a map.

As illustrated in FIG. 4A, the controller 110 may generate a data matrix of 'Z' (=N×K×2) cases depending on the 'N' sections defined on the GPS MAP, 'K' vehicle types, and the acceleration type or deceleration type.

At this time, the controller 110 may classify each type of driving data, using driving data and vehicle information received from each of the vehicle terminals 10 and may generate a data matrix corresponding to the type of the respective classified driving data. Here, the driving data may include the speed, acceleration, steering angle, GPS information, pressurization information about the accelerator and brake pedals, or the like of a vehicle.

The controller 110 may classify the driving data as an acceleration type and may generate an acceleration-based first data matrix of the corresponding section, when it is determined that the speed of the vehicle increases and the accelerator pedal is pressurized, from the driving data of each section. The controller 110 may store the driving data of the acceleration type in the first data matrix of the corresponding section.

Meanwhile, when it is determined that the speed of the vehicle decreases and the brake pedal is pressurized, the controller 110 may classify the driving data as a deceleration type and may generate a deceleration-based second data matrix of the corresponding section. The controller 110 may store the driving data of the deceleration type in the second data matrix of the corresponding section.

At this time, the controller 110 may store all or part of the driving data in the corresponding data matrix. For example, the controller 110 may store the speed, acceleration, and steering angle included in the driving data, in the corresponding data matrix.

In the meantime, the controller 110 may not store the corresponding driving data in the data matrix, when there is no speed change on the driving data or when the driving data includes sensor error information.

In this way, the driving data of each of vehicles passing through the corresponding section may be classified for each type and may be stored in the data matrix of each section.

Here, as illustrated in FIG. 4B, the data matrix may store a three-dimensional point, which has the speed, acceleration, and steering angle as coordinate values of the x, y, and z axes, respectively.

As illustrated in FIG. 5, each of the plurality of predetermined sections, for example, $A_1, A_2, A_3, \ldots, A_N$, may include a road area of a specific rate or more. At this time, each of the plurality of sections $A_1, A_2, A_3, \ldots, A_N$ may be arranged continuously along the road.

In one exemplary embodiment, the controller 110 may analyze the abnormal state of a vehicle, using the driving data stored in the data matrix of each section and may guide the analysis result to the corresponding vehicle.

First, the controller 110 calculates a mean value of each of the speed, acceleration, and steering angle from the driving data stored in the data matrix of each section during a predetermined time.

At this time, the controller 110 calculates a vector distance between mean values of the speed, the acceleration and the steering angle stored in the data matrix of each section during a predetermined time and the speed, acceleration and steering angle of the vehicle entering the corresponding section, and calculates a deviation percentage for the calculated vector distance. Here, the controller 110 may calculate the vector distance using the following Equation 1.

$$D=\sqrt{(x-m1)^2+(y-m2)^2+(z-m3)^2} \qquad \text{Equation 1}$$

In Equation 1, 'D' denotes a vector distance; 'x' denotes the speed of a vehicle entering the corresponding section; 'y' denotes the acceleration of a vehicle entering the corresponding section; 'z' denotes the steering angle of a vehicle entering the corresponding section; 'm1' denotes a speed mean value stored in the data matrix of the corresponding section; 'm2' denotes an acceleration mean value stored in the data matrix of the corresponding section; and 'm3' denotes a steering angle mean value stored in the data matrix of the corresponding section. Here, m1, m2, or m3 may be the mean value of values stored in the data matrix within the specific time interval.

Moreover, the controller 110 may obtain the failure rate information about the driving or braking function for each vehicle type. At this time, the controller 110 may compare the obtained failure rate information with the previously calculated deviation percentage and may determine the driving abnormality state of the vehicle passing through the corresponding section depending on the comparison result.

At this time, the controller 110 detects a driving abnormality state of the corresponding vehicle at a predetermined time unit from a first time point when the vehicle enters the corresponding section to a second time point when the vehicle leaves the corresponding section. The controller 110 stores driving abnormality information of the corresponding vehicle in a data matrix of the corresponding section, when the driving abnormality state of a specific rate or more is continuously detected for the corresponding vehicle from a first time point when the vehicle enters the corresponding section to a second time point when the vehicle leaves the corresponding section.

The controller 110 may receive information about the driving termination of the vehicle. The controller 110 extracts a data matrix storing the driving abnormality information of the corresponding vehicle among the data matrices corresponding to the respective sections on the driving route of the vehicle when the driving of the vehicle is terminated. The controller 110 may determine the driving abnormality state for the corresponding vehicle, when the data matrix storing the driving abnormality information of the vehicle is continuously detected to be greater than or equal to a specific rate.

The controller 110 transmits a driving abnormality notification signal to at least one of the vehicle and the pre-registered terminal, when the driving abnormality state of the vehicle is determined. For example, the controller 110 may transmit the driving abnormality notification signal to the vehicle. Also, the controller 110 may transmit the driving abnormality notification signal to the pre-registered portable terminal of a user.

In another exemplary embodiment, the controller 110 may analyze the abnormal state of a road, using the driving data stored in the data matrix of each section and may guide the analysis result to vehicles in the corresponding section or at a periphery of the corresponding section.

First, the controller 110 calculates the mean value and standard deviation of each of the speed, acceleration and steering angle for each of a plurality of sections from the driving data stored in each data matrix during a predetermined time. Moreover, the controller 110 compares the speed, acceleration, and steering angle of each of vehicles passing through each of the plurality of sections and the mean values of the speed, acceleration, and steering angle for each section, respectively.

At this time, the controller 110 determines whether there is a vehicle, in which the speed, acceleration, and steering angle of each of vehicles passing through a specific section are out of the range of the standard deviation from the mean values of the speed, acceleration, and steering angle stored in the data matrix of the corresponding section. The controller 110 detects a road abnormality state for the corresponding section, when the rate of vehicles that is out of the standard deviation from the mean value of each of the speed, acceleration and steering angle stored in the data matrix of the corresponding section is not less than a certain rate.

The controller 110 may determine the road abnormality state of the corresponding road section, when the road abnormality state is detected in continuous sections, the number of which is not less than a specific number.

The controller 110 may transmit the road abnormality notification signal to vehicles that are driving on the corresponding road section or on a road adjacent to the corresponding road section, when the road abnormality state of one road section is determined.

The apparatus 100 according to the present exemplary embodiment operating as described above may be implemented in the form of an independent hardware device including a memory and a processor for processing each operation and may be driven in the form included in other hardware devices such as a microprocessor or a general purpose computer system.

The operation flow of the apparatus according to an exemplary embodiment of the present disclosure will be described in more detail as follows.

Figure 6:
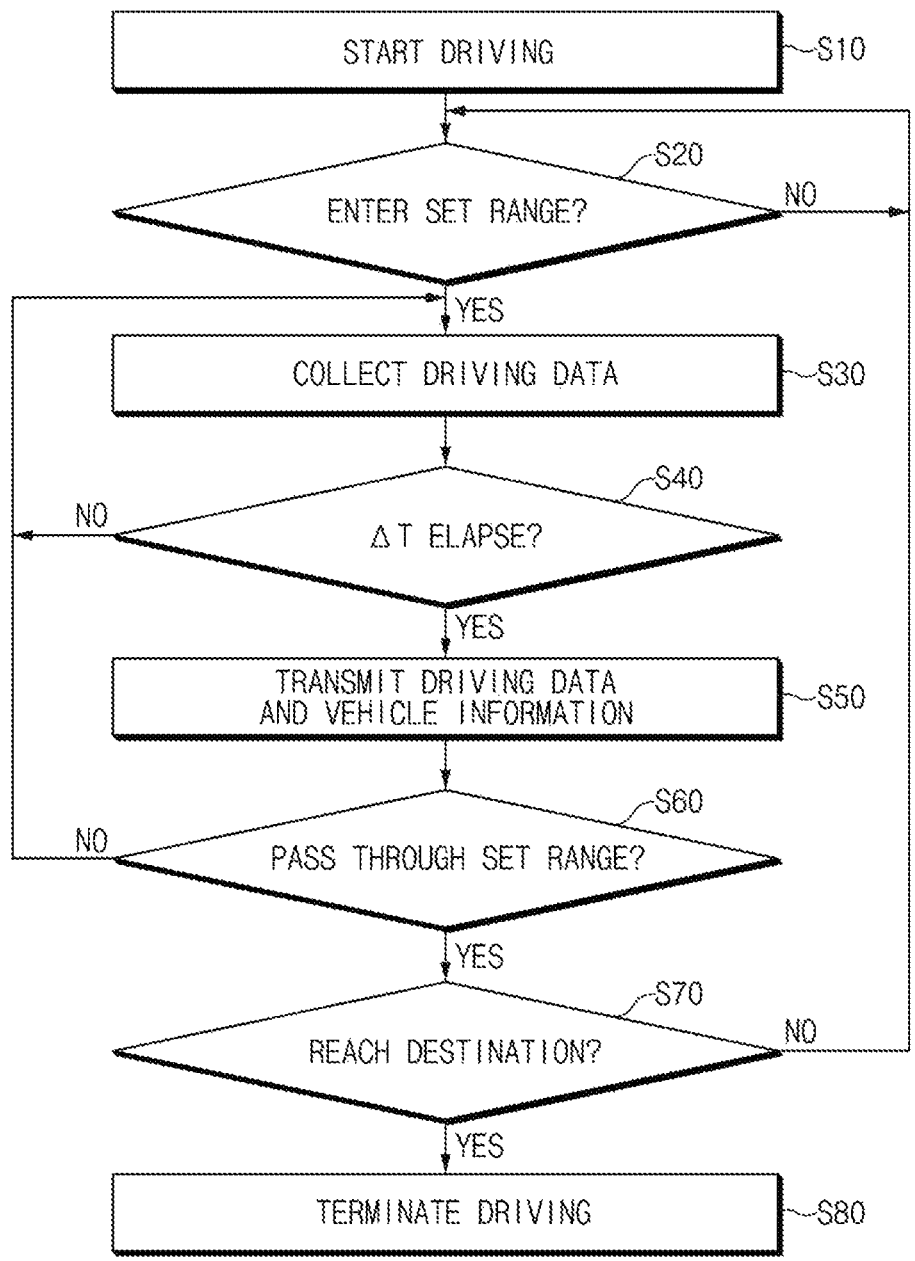
FIG. 6 is a flowchart illustrating an operating method of a vehicle terminal, according to an exemplary embodiment of the present disclosure.

FIG. 6 is a flowchart illustrating an operating method of a vehicle terminal, according to an exemplary embodiment of the present disclosure.

Referring to FIG. 6, when a vehicle starts driving in operation S10 and enters a preset section in operation S20, the vehicle terminal 10 collects driving data through a plurality of sensors in operation S30. Here, the driving data may include the speed, acceleration, steering angle, GPS information and pressurization information about the accelerator and brake pedals, or the like of a vehicle.

The vehicle terminal 10 collects driving data; in operation S40, when a specific time ΔT elapses, in operation S50, the vehicle terminal 10 transmits driving data collected in operation S30 and vehicle information, to the driving data analyzing apparatus 100.

Operation S30 to operation S50 are performed repeatedly until a vehicle passes through the set section. When the vehicle passes through the set section in operation S60, the vehicle terminal 10 returns to operation S20 and then determines whether the vehicle enters the next set section; the vehicle terminal 10 repeats operation S20 to operation S60, when the vehicle enters the set section.

When the vehicle reaches the destination in operation S70, the vehicle terminal 10 terminates driving in operation S80.

Figure 7:
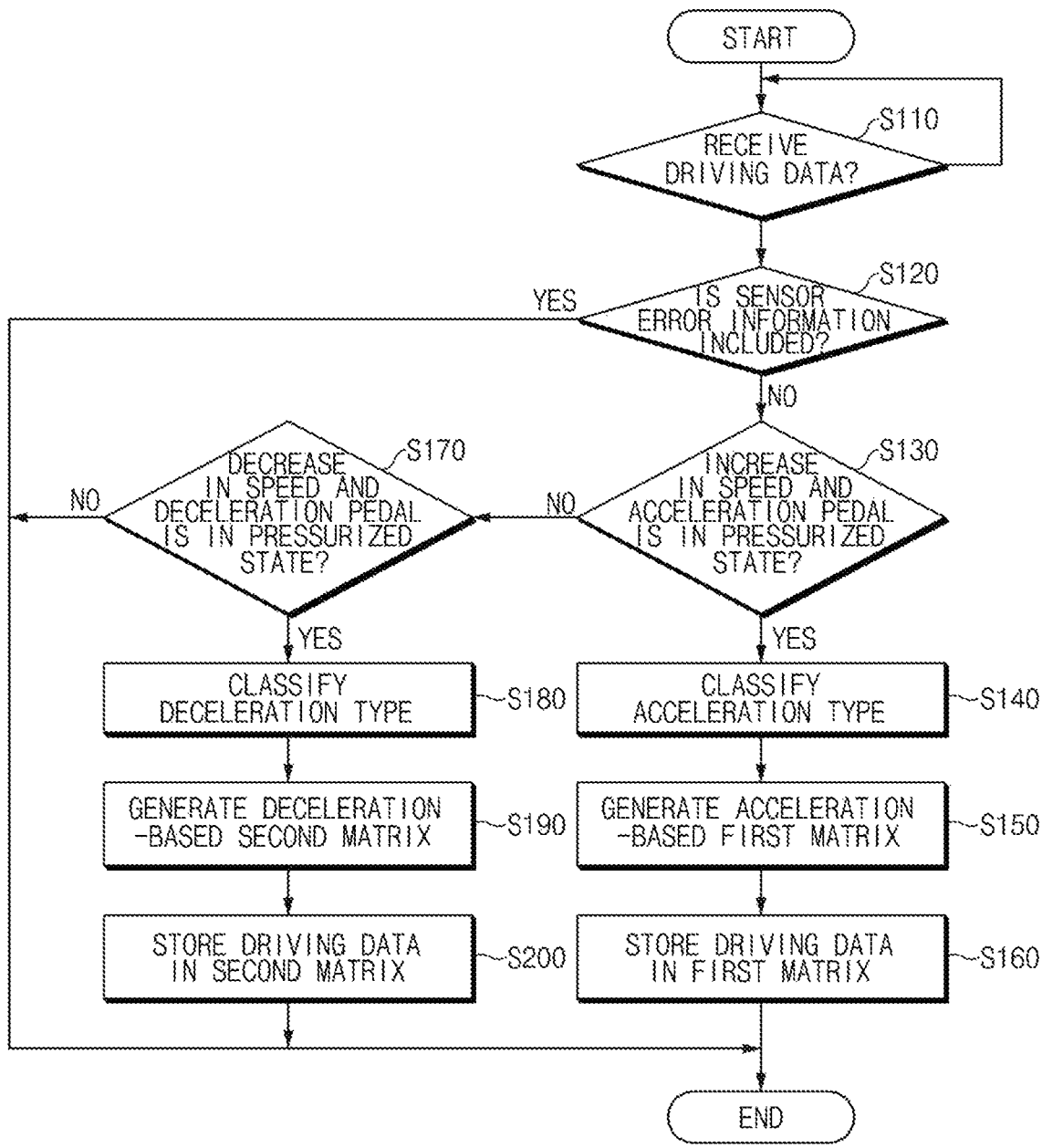
FIG. 7 is a flowchart illustrating a data matrix generating method, according to an exemplary embodiment of the present disclosure.

FIG. 7 is a flowchart illustrating a data matrix generating method, according to an exemplary embodiment of the present disclosure.

Referring to FIG. 7, when driving data is received from the vehicle terminal 10 in operation S110, the driving data analyzing apparatus 100 may determine whether the driving data received in operation S110 includes sensor error information in operation S120. The driving data analyzing apparatus 100 may not store the corresponding driving data separately, when the driving data includes the sensor error information.

In the meantime, the driving data analyzing apparatus 100 analyzes driving data, when it is determined that the driving data does not include the sensor error information.

When the driving data shows an increase in speed of a vehicle and a pressurized state of an accelerator pedal in operation S130, the driving data analyzing apparatus 100 classifies the corresponding driving data as an acceleration type in operation S140. In this case, the driving data analyzing apparatus 100 generates an acceleration-based first data matrix for the corresponding section in operation S150 and stores the driving data in the generated first data matrix in operation S160.

Meanwhile, when the driving data shows a decrease in speed of a vehicle and a pressurized state of a brake pedal in operation S170, the driving data analyzing apparatus 100 classifies the corresponding driving data as a deceleration type in operation S180. In this case, the driving data analyzing apparatus 100 generates a deceleration-based second data matrix for the corresponding section in operation S190 and stores the driving data in the generated second data matrix in operation S200.

The driving data analyzing apparatus 100 obtains a data matrix including driving data classified for each section, for each vehicle type, and for each acceleration or deceleration type by performing the operations of FIG. 7 for each predetermined section.

Figure 8A:
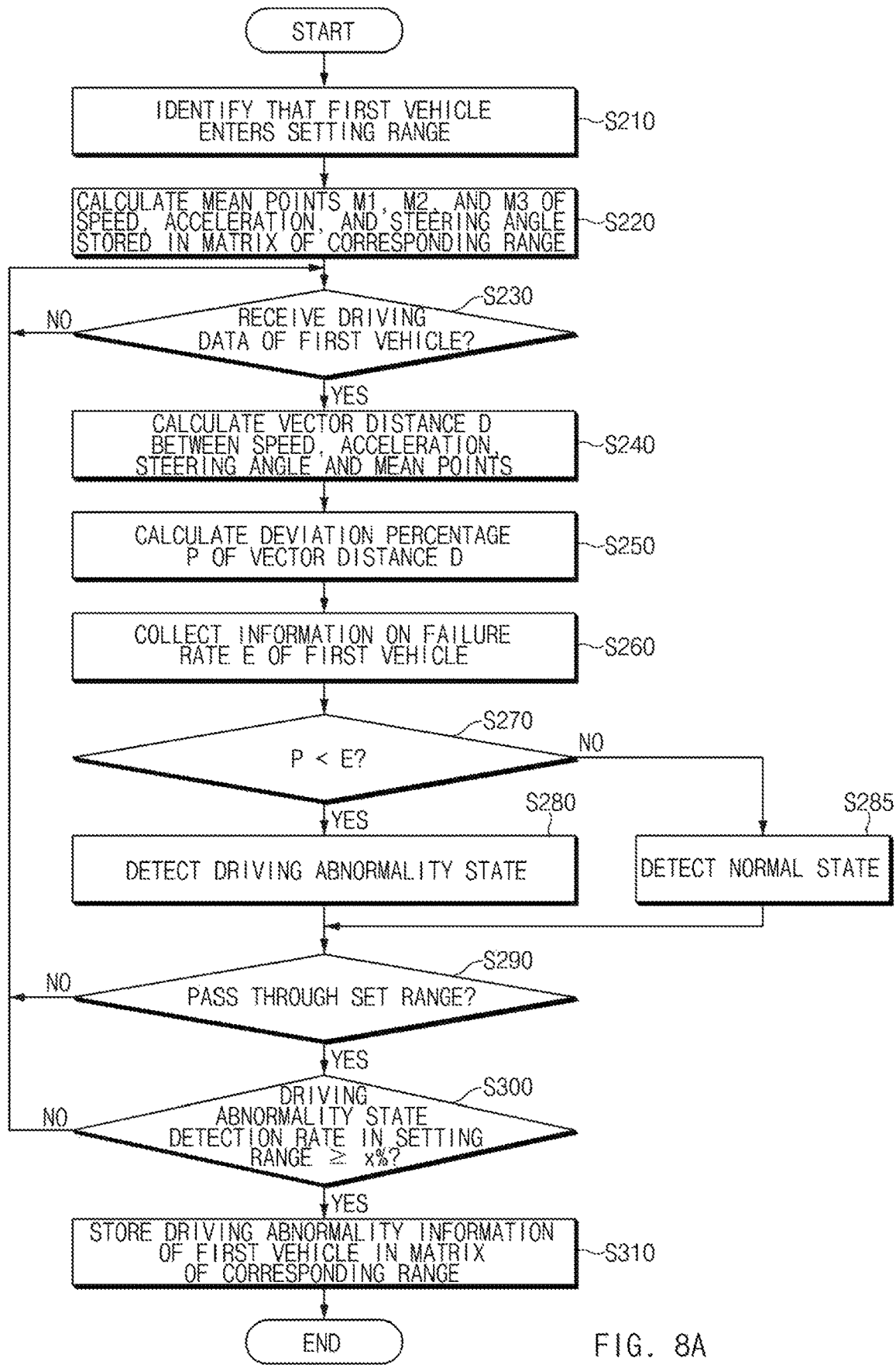
FIGS. 8A and 8B are flowcharts illustrating a driving data analyzing method, according to the first exemplary embodiment of the present disclosure.
Figure 8B:
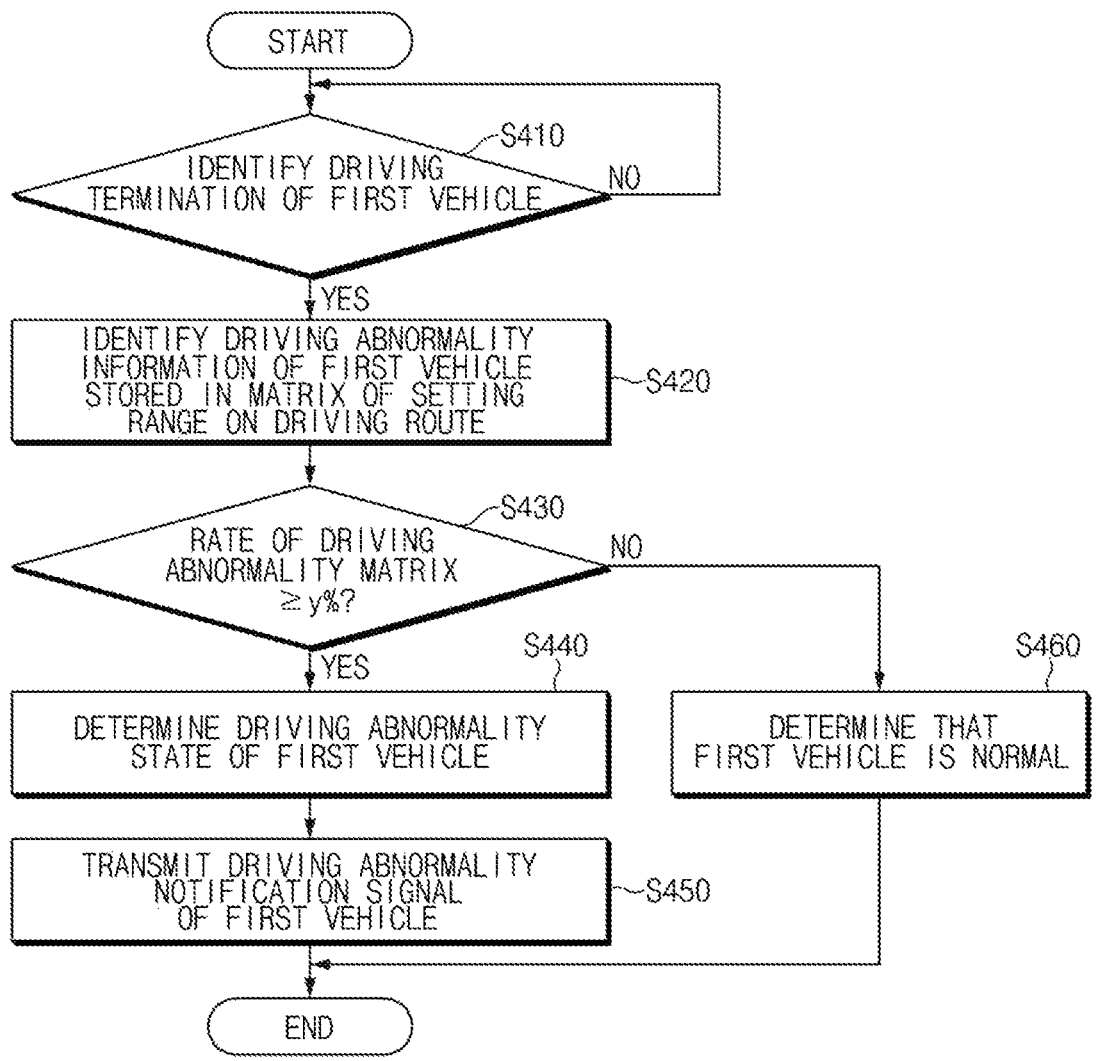

FIGS. 8A and 8B are flowcharts illustrating a driving data analyzing method, according to the first exemplary embodiment of the present disclosure.

Referring to FIG. 8A, when it is identified that a first vehicle enters a preset section in operation S210, the driving data analyzing apparatus 100 calculates the driving data stored in the data matrix of the corresponding section (i.e., the mean points m1, m2, and m3 of speed, acceleration, and steering angle) in operation S220.

When the driving data is received from the first vehicle in operation S230, in operation S240, the driving data analyzing apparatus 100 calculates the vector distance D between the speed, acceleration, and steering angle of the first vehicle included in the received driving data and the mean points calculated in operation S220. The calculation of the vector distance D in operation S240 refers to Equation 1 described above.

In operation S250, the driving data analyzing apparatus 100 calculates the deviation percentage P of the vector distance D calculated in operation S240.

Moreover, in operation S260, the driving data analyzing apparatus 100 collects information on the failure rate E of the first vehicle. An embodiment is exemplified in FIG. 8A as the failure rate information of the first vehicle is collected after operation S250. However, it is natural that operation S260 may be performed before operation S260.

At this time, when the deviation percentage P calculated in operation S250 is less than the failure rate E of the first vehicle in operation S270, the driving data analyzing apparatus 100 detects the driving abnormality state of the vehicle in operation S280; otherwise, the driving data analyzing apparatus 100 detects the normal state in operation S285.

Until the first vehicle passes through the set section, the driving data analyzing apparatus 100 may perform operation S230 to operation S285 and may periodically detect the driving abnormality state or the normal state of the first vehicle.

When the first vehicle passes through the set section in operation S290, when the first vehicle's driving abnormality state detection rate is not less than the first rate (x %) within the set section in operation S300, the driving data analyzing apparatus 100 stores the driving abnormality information of the first vehicle in a data matrix of the corresponding section in operation S310.

The operations of FIG. 8A may be repeated whenever the first vehicle enters a set section while being driving on a road.

Afterward, as illustrated in FIG. 8B, when the driving termination of the first vehicle is identified in operation S410, the driving data analyzing apparatus 100 identifies the driving abnormality information of the first vehicle stored in the data matrix of each section on the driving route of the first vehicle in operation S420.

When the rate of the driving abnormality data matrix storing the driving abnormality information of the first vehicle is not less than the second rate (y %) in operation S430, the driving data analyzing apparatus 100 determines the driving abnormality state of the first vehicle in operation S440. In this case, in operation S450, the driving data analyzing apparatus 100 transmits a driving abnormality notification signal to at least one of the first vehicle and the pre-registered terminal, when the driving abnormality state of the first vehicle is determined.

Meanwhile, when the rate of the driving abnormality data matrix storing the driving abnormality information of the first vehicle is less than the second rate (y %) in operation S430, in operation S460, the driving data analyzing apparatus 100 determines that the first vehicle is normal.

Figure 9A:
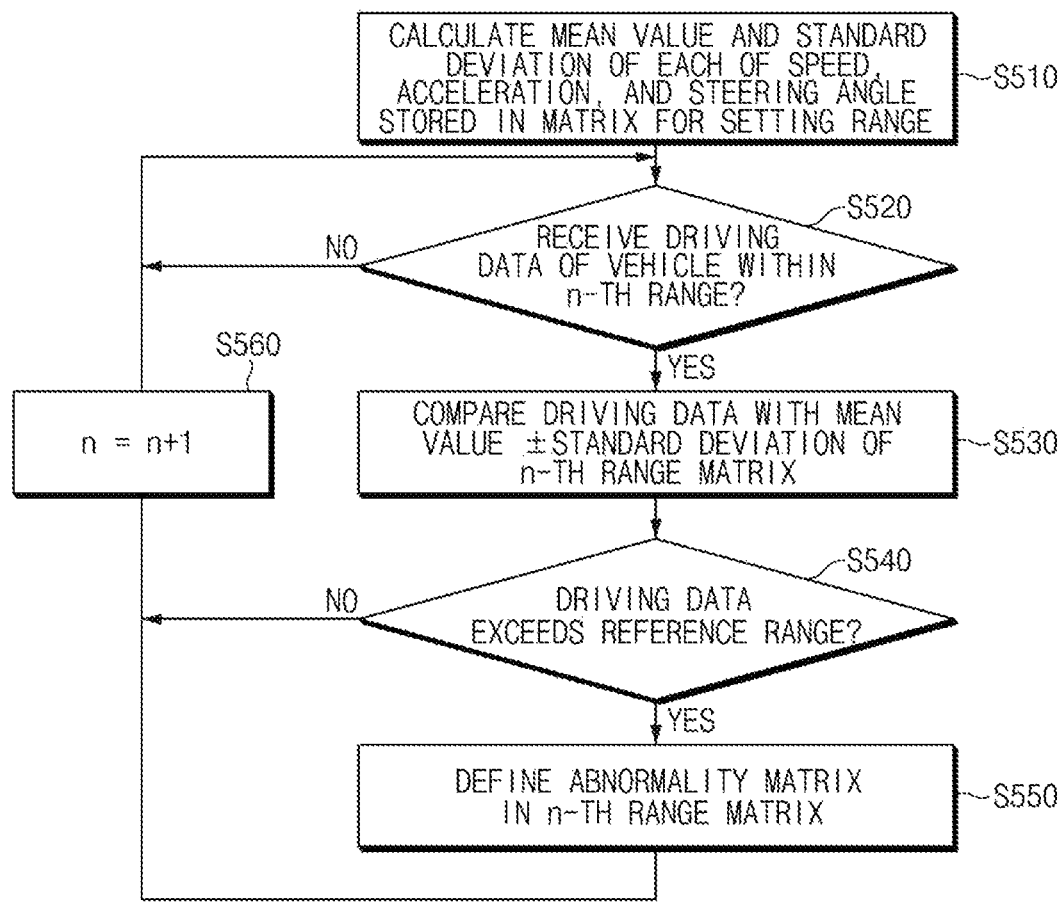
FIGS. 9A and 9B are flowcharts illustrating a driving data analyzing method, according to the second exemplary embodiment of the present disclosure.
Figure 9B:
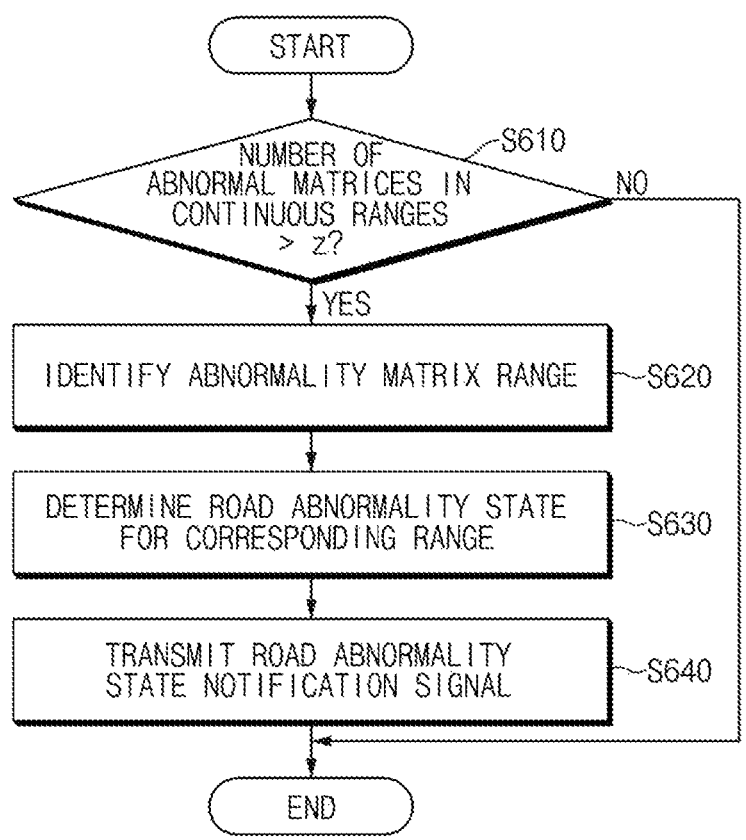

FIGS. 9A and 9B are flowcharts illustrating a driving data analyzing method, according to the second exemplary embodiment of the present disclosure.

Referring to FIG. 9A, in operation S510, the driving data analyzing apparatus 100 calculates the mean value and standard deviation of each of the speed, acceleration, and steering angle for each of a plurality of sections from the driving data stored in each data matrix during a predetermined time.

When the driving data is received from a vehicle within the n-th section in operation S520, in operation S530, the driving data analyzing apparatus 100 compares driving data with the mean value+standard deviation of the driving data stored in the n-th section data matrix. When the comparison result in operation S530 indicates that the driving data exceeds the reference range (i.e., the range of the mean value+standard deviation of the driving data stored in the n-th section data matrix) in operation S540, the driving data analyzing apparatus 100 defines the abnormality data matrix in the n-th section data matrix in operation S550.

In this manner, the driving data analyzing apparatus 100 performs operation S520 to operation S550 on continuous sections (e.g., 'n', 'n+1', and 'n+2' sections).

Afterward, as illustrated in FIG. 9B, when the number of abnormal data matrices in continuous sections exceeds a specific number 'z' in operation S610, the driving data analyzing apparatus 100 identifies the section corresponding to the abnormality data matrix in operation S620 and determines the road abnormality state for the identified section in operation S630.

In operation S640, the driving data analyzing apparatus 100 may transmit the road abnormality state notification signal to vehicles that are driving on the corresponding road section or on a road adjacent to the corresponding road section, when the road abnormality state of one road section is determined in operation S630.

Figure 10:
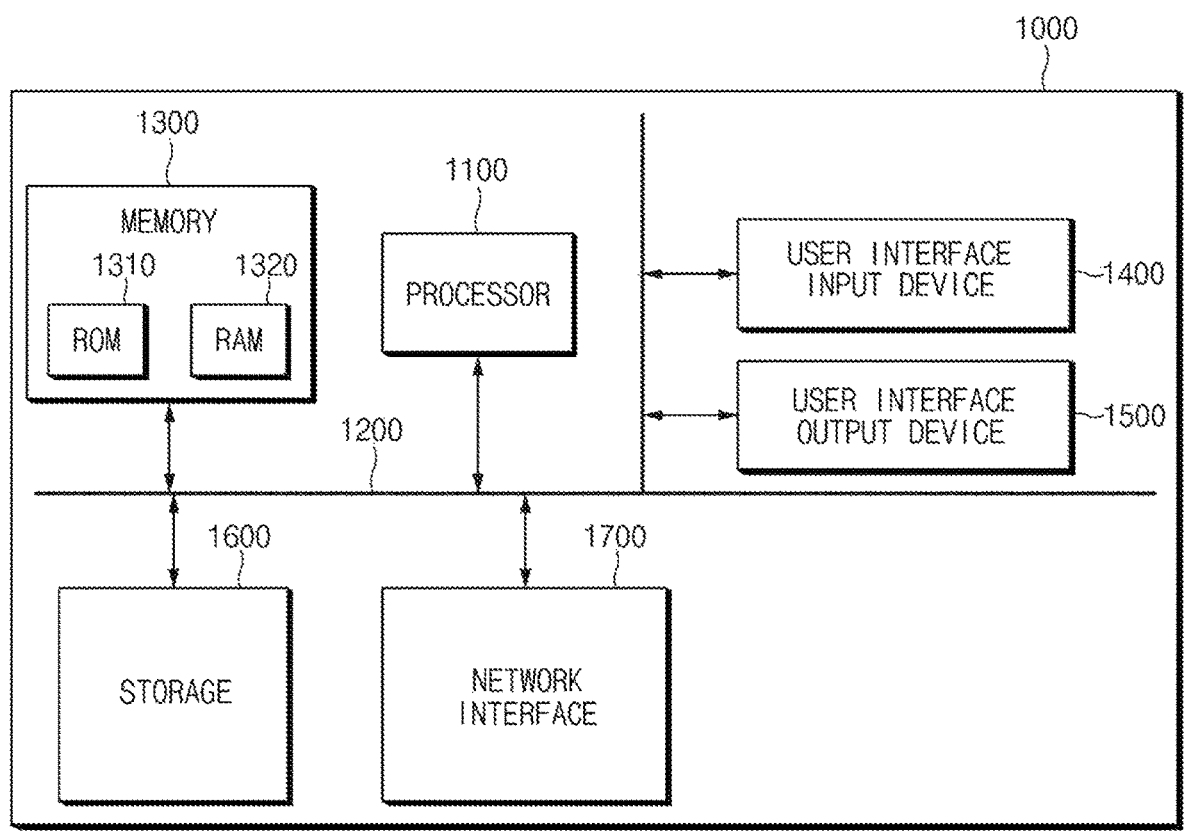
FIG. 10 is a diagram illustrating a computing system performing a method, according to an exemplary embodiment of the present disclosure.

FIG. 10 is a diagram illustrating a computing system performing a method, according to an exemplary embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an exemplary embodiment of the present disclosure, it is possible to classify and store driving data for each section of road, for each vehicle type, for each acceleration type or deceleration type, and to easily detect the abnormal driving state of the vehicle or the abnormal state of the road through the classified driving data.

Furthermore, according to an exemplary embodiment of the present disclosure, it is possible to prevent the accident caused by the vehicle failure by transmitting an abnormal state of the vehicle to the vehicle or surrounding vehicles when the abnormal state of the vehicle is detected. Moreover, a vehicle is driving while avoiding the section of the abnormal state, by detecting an abnormal state of the road and transmitting the abnormal state of the road to vehicles in the corresponding section or the neighboring section.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A driving data analyzing apparatus comprising:
a database (DB) configured to store a data matrix for each of a plurality of sections predetermined on a road of a map; and
a controller configured to store driving data comprising at least one of speed, acceleration, or steering angle received from vehicles passing through each of the plurality of sections in the data matrix of a corresponding section,
wherein the controller is further configured to:
calculate a mean value of each of the at least one of speed, acceleration, or steering angle from the driving data stored in each data matrix during a specific time, and
analyze a driving abnormality state of a vehicle passing through the corresponding section based on the calculated mean value.

2. The driving data analyzing apparatus of claim 1, wherein the data matrix is classified into a plurality of data matrices for each of the plurality of sections depending on a vehicle type and an acceleration or deceleration type of the driving data.

3. The driving data analyzing apparatus of claim 2, wherein the controller is configured to:
classify a type of each driving data, using the driving data and vehicle information received from each of the vehicles; and
determine a data matrix corresponding to the classified type of each driving data to store the driving data in the corresponding data matrix.

4. The driving data analyzing apparatus of claim 3, wherein the driving data further includes GPS information, and pressurization information of an accelerator pedal and a brake pedal of the vehicle.

5. The driving data analyzing apparatus of claim 4, wherein the controller is configured to:
classify the driving data as an acceleration type when the speed of the vehicle is determined to be increasing, and the accelerator pedal is determined to be in a pressurized state; and
classify the driving data as a deceleration type when the speed of the vehicle is determined to be decreasing, and the brake pedal is determined to be in a pressurized state.

6. The driving data analyzing apparatus of claim 1, wherein the controller is configured to:
calculate a vector distance between mean values of each of the speed, the acceleration, and the steering angle stored in each data matrix during the specific time and the speed, the acceleration, and the steering angle of the vehicle entering the corresponding section; and
calculate a deviation percentage for the calculated vector distance.

7. The driving data analyzing apparatus of claim 6, wherein the controller is configured to:
collect failure rate information about a driving or braking function for each vehicle type to compare the failure rate information with the calculated deviation percentage; and
determine the driving abnormality state of the vehicle passing through the corresponding section depending on the comparison result.

8. The driving data analyzing apparatus of claim 7, wherein the controller is configured to:
detect the driving abnormality state of the vehicle at a predetermined time unit from a first time point when the vehicle enters the corresponding section to a second time point when the vehicle leaves the corresponding section.

9. The driving data analyzing apparatus of claim 8, wherein the controller is configured to:
when the driving abnormality state of a specific rate or more is continuously detected for the vehicle from the first time point when the vehicle enters the corresponding section to the second time point when the vehicle leaves the corresponding section, store driving abnormality information of the vehicle in a corresponding data matrix.

10. The driving data analyzing apparatus of claim 9, wherein the controller is configured to:
when the data matrix, which stores the driving abnormality information of the vehicle, from among data matrices corresponding to each section on a driving route of the vehicle is continuously detected more than the specific rate when driving of the vehicle is terminated, determine the driving abnormality state of the vehicle.

11. The driving data analyzing apparatus of claim 10, wherein the controller is configured to:
when the driving abnormality state of the vehicle is determined, transmit a driving abnormality notification signal to at least one of the vehicle and a terminal registered in advance.

12. A driving data analyzing apparatus comprising:
a DB configured to store a data matrix for each of a plurality of sections predetermined on a road of a map; and
a controller configured to store driving data comprising at least one of speed, acceleration, or steering angle received from vehicles passing through each of the plurality of sections in the data matrix of a corresponding section,
wherein the controller is configured to:
calculate a mean value of each of the at least one of speed, acceleration, or steering angle from the driving data stored in each data matrix during a specific time, and
analyze a road abnormality state of the corresponding section based on the calculated mean value.

13. The driving data analyzing apparatus of claim 12, wherein the data matrix is classified into a plurality of data matrices for each of the plurality of sections depending on a vehicle type and an acceleration or deceleration type of the driving data.

14. The driving data analyzing apparatus of claim 12, wherein the controller is configured to:
calculate a mean value and a standard deviation of each of speed, acceleration, and steering angle for each of the plurality of sections from the driving data stored in each data matrix during a predetermined time.

15. The driving data analyzing apparatus of claim 14, wherein the controller is configured to:
compare speed, acceleration, and steering angle of each of the vehicles passing through each of the plurality of sections with mean values of speed, acceleration, and steering angle for each of the plurality of sections to determine the road abnormality state of the corresponding section depending on the comparison result.

16. The driving data analyzing apparatus of claim 15, wherein the controller is configured to:
when a rate of vehicles that are out of a range of a standard deviation from the mean value of each of speed, acceleration, and steering angle for the corresponding section among speeds, accelerations, and steering angles of each of the vehicles passing through the plurality of sections is not less than a specific rate, detect the road abnormality state of the corresponding section.

17. The driving data analyzing apparatus of claim 16, wherein the controller is configured to:
when the road abnormality state is detected in continuous sections, the number of which is not less than a specific number, determine the road abnormality state of a corresponding road section.

18. The driving data analyzing apparatus of claim 17, wherein the controller is configured to:
when the road abnormality state of one road section is determined, transmit the road abnormality notification signal to the vehicles that are driving on the corresponding road section or on a road adjacent to the corresponding road section.

19. A method of analyzing driving data, the method comprising:
storing a data matrix for each of a plurality of sections predetermined on a road of a map, in a DB;
storing driving data comprising at least one of speed, acceleration, or steering angle received from vehicles passing through each of the plurality of sections in a data matrix of a corresponding section;
calculating a mean value of each of the at least one of speed, acceleration, or steering angle from the driving data stored in each data matrix during a specific time; and
analyzing a driving abnormality state of a vehicle passing through the corresponding section, or a road abnormality state of the corresponding section based on the calculated mean value.

20. A vehicle system comprising:
a plurality of vehicle terminals configured to collect driving data comprising at least one of speed, acceleration, or steering angle from a plurality of sensors when driving in a section predetermined on a road; and
a driving data analyzing apparatus configured to:
store the driving data received from the plurality of vehicle terminals in a data matrix of the corresponding section;
calculate a mean value of each of the at least one of speed, acceleration, or steering angle from the driving data stored in each data matrix during a specific time; and
analyze a driving abnormality state of a vehicle passing through the corresponding section or a road abnormality state of the corresponding section based on the calculated a-mean value.

21. The vehicle system of claim 20, wherein the vehicle terminal is configured to:
when a driving abnormality notification signal of the vehicle is received from the driving data analyzing apparatus, turn on a warning light.

22. The vehicle system of claim 20, wherein the vehicle terminal is configured to:
when a road abnormality notification signal for one section is received from the driving data analyzing apparatus, guide a road abnormality section through a navigation.

* * * * *